US012639094B2

(12) United States Patent
Bishop

(10) Patent No.: US 12,639,094 B2
(45) Date of Patent: May 26, 2026

(54) ON-DIE COMPUTER APPARATUS

(71) Applicant: BAE SYSTEMS PLC, London (GB)

(72) Inventor: Simon Bishop, Bournemouth (GB)

(73) Assignee: BAE SYSTEMS PLC, London (GB)

( * ) Notice: Subject to any disclaimer, the term of this patent is extended or adjusted under 35 U.S.C. 154(b) by 739 days.

(21) Appl. No.: 17/923,979

(22) PCT Filed: May 18, 2021

(86) PCT No.: PCT/GB2021/051182
§ 371 (c)(1),
(2) Date: Nov. 8, 2022

(87) PCT Pub. No.: WO2021/234357
PCT Pub. Date: Nov. 25, 2021

(65) Prior Publication Data
US 2023/0168915 A1 Jun. 1, 2023

(30) Foreign Application Priority Data

May 21, 2020 (EP) .................................... 20275093
May 21, 2020 (GB) .................................... 2007585

(51) Int. Cl.
*G06F 9/455* (2018.01)
*G06F 12/10* (2016.01)
*G06F 12/14* (2006.01)

(52) U.S. Cl.
CPC .......... *G06F 9/45558* (2013.01); *G06F 12/10* (2013.01); *G06F 12/1408* (2013.01);
(Continued)

(58) Field of Classification Search
CPC .. G06F 9/45558; G06F 12/10; G06F 12/1408; G06F 2009/45587; G06F 2212/1052; G06F 21/62; G06F 21/53
See application file for complete search history.

(56) References Cited

U.S. PATENT DOCUMENTS

2011/0131375 A1* 6/2011 Noeldner ................ G06F 12/00
711/E12.001
2015/0058580 A1* 2/2015 Lagar Cavilla ..... G06F 9/45533
711/149
(Continued)

OTHER PUBLICATIONS

International Search Report and Written Opinion dated Jul. 28, 2021 issued in PCT/GB2021/051182.
(Continued)

*Primary Examiner* — Kenneth Tang
(74) *Attorney, Agent, or Firm* — Scully, Scott, Murphy & Presser, P.C.

(57) ABSTRACT
An on-die computer apparatus (100) comprises a plurality of cores (106) and a plurality of RAM modules (100). Sets of physical memory addresses in the RAM modules are allocated for use by virtual machines executing on the cores. A plurality of data transfer channels (112) are associated the RAM modules. The apparatus further comprises a channel controller (120) for controlling data transfer over the data transfer channels. The channel controller stores security information indicating which of the VMs is designated as secure, and channel information indicating which of the data transfer channels is assigned for use by each of the VMs for accessing its allocated physical memory addresses. The channel controller directs read/write requests from a VM over the data transfer channel assigned to the VM based on the security information and the channel information.

20 Claims, 5 Drawing Sheets

(52) U.S. Cl.
CPC .............. *G06F 2009/45587* (2013.01); *G06F 2212/1052* (2013.01)

(56) References Cited

U.S. PATENT DOCUMENTS

| | | | |
|---|---|---|---|
| 2015/0248357 A1* | 9/2015 | Kaplan | G06F 12/1408 |
| | | | 713/193 |
| 2017/0163575 A1* | 6/2017 | Wang | H04L 49/9094 |
| 2017/0346628 A1* | 11/2017 | Lee | H04L 9/0838 |
| 2018/0107608 A1 | 4/2018 | Kaplan et al. | |
| 2019/0042796 A1 | 2/2019 | Von Bokern et al. | |
| 2020/0201787 A1* | 6/2020 | Shanbhogue | G06F 12/1408 |
| 2021/0200880 A1* | 7/2021 | Khosravi | G06F 21/79 |
| 2021/0247935 A1* | 8/2021 | Beygi | G06F 3/061 |
| 2024/0250823 A1* | 7/2024 | Brandt | G06F 9/30178 |

OTHER PUBLICATIONS

GB Search Report dated Feb. 10, 2021 issued in GB 2007585.9.
Extended EP Search Report dated Nov. 6, 2020 issued in EP 20275093.1.
Zhao, Siqi et al., On the Effectiveness of Virtualization Based Memory Isolation on Multi core Platforms, 2017 IEEE European Symposium on Security and Privacy (EUROS&P), IEEE (Apr. 26, 2017), pp. 546-560.

\* cited by examiner

ON-DIE COMPUTER APPARATUS

FIELD OF THE INVENTION

The present invention relates to on-die computer apparatus.

BACKGROUND

Computer apparatus can store large amounts of data, much of which may be private or sensitive. Such data can be vulnerable to unauthorised access if not secured.

It is also known to execute virtual machines (VMs), which are software emulations of computers, using on-die multi-core computers. Such VMs can be configured not to be visible to each other for security reasons and run on different cores, but they all share memory. A VM that has been compromised (e.g. by a virus, hypervisor bug or unauthorised access) could access memory that only other VMs are intended to use.

In order to address such issues, secure memory techniques have been developed. One known example is Secure Memory Encryption (SME) technology, produced by Advanced Micro Devices, Inc (AMD). However, where a number of VMs operate on the same die, there is a risk that one compromised memory channel could expose all of the CPU cores to a security breach, even when a secure memory technique such as SME is used.

SUMMARY

Embodiments of the present invention are intended to address the above technical problem.

Embodiments can provide an on-die computer apparatus including a data transfer channel controller that controls data transfer such that one compromised VM cannot infect another VM by way of memory.

According to an aspect of the present invention, there is provided an on-die computer apparatus comprising:

a plurality of cores;

a plurality of RAM modules, each of the RAM modules comprising a plurality of storage locations having a corresponding plurality of physical memory addresses, wherein a plurality of sets of the physical memory addresses are allocated for use by a respective plurality of virtual machines, VMs, each of the VMs being executed by at least one of the plurality of cores;

a plurality of data transfer channels, each of the data transfer channels being associated with one of the RAM modules, and a channel controller for controlling data transfer over the plurality of data transfer channels, the channel controller configured to:

store security information indicating which of the VMs is designated as secure, and channel information indicating which of the data transfer channels is assigned for use by each of the VMs for accessing its allocated physical memory addresses, and direct read/write requests from a said VM over the data transfer channel assigned to the VM based on the security information and the channel information.

The channel controller may be configured to determine, based on the security information, if a said VM is designated as secure, and to only allow the secure VM to read/write data over its assigned data transfer channel. A said RAM module having said storage locations corresponding to the physical memory addresses allocated to the secure VM may be configured not to store data for another of the plurality of VMs.

Each of the plurality of data transfer channels may be associated with a respective one of a plurality of encryption/decryption components, e.g. an AES encryption/decryption component. The channel controller may be further configured to store information indicating if data related to the read/write requests from each of the VMs is to be encrypted/decrypted by a said encryption/decryption component.

The channel controller may be located between, and control data transfer between, the plurality of cores and a memory controller that includes the encryption/decryption components.

The encryption/decryption may be performed using a cipher/key unique to each of the plurality of data transfer channels.

The channel controller may be further configured to:

generate an intermediate memory address for each of the physical memory addresses, and convert a said intermediate memory address associated with a said read/write request into the physical memory address generated for the intermediate memory address.

The security information and the channel information may be stored in a secure storage area in a storage device within the channel controller.

At least one of the cores may execute a hypervisor configured to allocate the plurality of sets of the physical memory addresses for use by the respective plurality VMs.

According to another aspect of the present invention there is provided a controller for controlling data transfer over a plurality of data transfer channels, each of the data transfer channels being associated with one of a plurality of RAM modules of an on-die computer apparatus comprising a plurality of cores, wherein each of the RAM modules comprises a plurality of storage locations having a corresponding plurality of physical memory addresses, and wherein a plurality of sets of the physical memory addresses are allocated for use by a respective plurality of virtual machines, VMs, each of the VMs being executed by at least one of the plurality of cores, wherein the controller is configured to:

store security information indicating which of the VMs is designated as secure, and channel information indicating which of the data transfer channels is assigned for use by each of the VMs for accessing its allocated physical memory addresses, and direct read/write requests from a said VM over the data transfer channel assigned to the VM based on the security information and the channel information.

According to yet another aspect of the present invention, there is provided a method of operating an on-die computer apparatus comprising a plurality of cores and a plurality of RAM modules, each of the RAM modules comprising a plurality of storage locations having a corresponding plurality of physical memory addresses, the method comprising:

allocating a plurality of sets of the physical memory addresses for use by a respective plurality of virtual machines, VMs, each of the VMs being executed by at least one of the plurality of cores, storing, by a channel controller configured to control data transfer over a plurality of data transfer channels, each of the data transfer channels being associated one of the RAM modules, security information indicating which of the VMs is designated as secure, and channel information indicating which of the data transfer channels is assigned for use by each of the VMs to access its allocated physical memory addresses, and directing, by the channel controller, read/write requests from a said VM over the data transfer channel assigned to the VM based on the security information and the channel information.

The method may further comprise the channel controller determining, based on the security information, if a said VM is designated as secure, and only allowing the secure VM to read/write data over its assigned data transfer channel, wherein a said RAM module having said storage locations corresponding to the physical memory addresses allocated to the secure VM is configured not to store data for another of the plurality of VMs.

Each of the plurality of data transfer channels may be associated with a respective one of a plurality of encryption/decryption components. The channel controller may store information indicating if data related to the read/write requests from each of the VMs is to be encrypted/decrypted by a said encryption/decryption component. The channel controller may control data transfer between the plurality of cores and a memory controller that includes the plurality of encryption/decryption components. A said encryption/decryption component may perform encryption/decryption by using a cipher/key unique to its associated data transfer channel.

The method may further comprise:

generating, by the channel controller, an intermediate memory address for each of the physical memory addresses;

converting, by a memory management unit, a virtual memory address specified in a said write request into an intermediate memory address, and converting, by the channel controller, the intermediate memory address into the physical memory address generated for the intermediate memory address.

According to an alternative aspect of the present invention there is provided a method of reading/writing data comprising:

receiving a read/write request from a virtual machine being executed by at least one core of an on-die computer apparatus;

converting a virtual memory address specified in the read/write request into an intermediate memory address, and converting the intermediate memory address into a physical memory address, wherein a plurality of intermediate memory addresses is generated for a respective plurality of physical memory addresses on at least one RAM module of the on-die computer apparatus.

According to a further aspect of the present invention there is provided a computer readable medium (or circuit) storing a computer program to operate methods substantially as described herein.

It will be appreciated that features described in relation to one aspect of the present invention can be incorporated into other aspects of the present invention. For example, an apparatus of the invention can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Embodiments of the invention will now be described by way of example only and with reference to the accompanying drawings.

DETAILED DESCRIPTION

Figure 1:
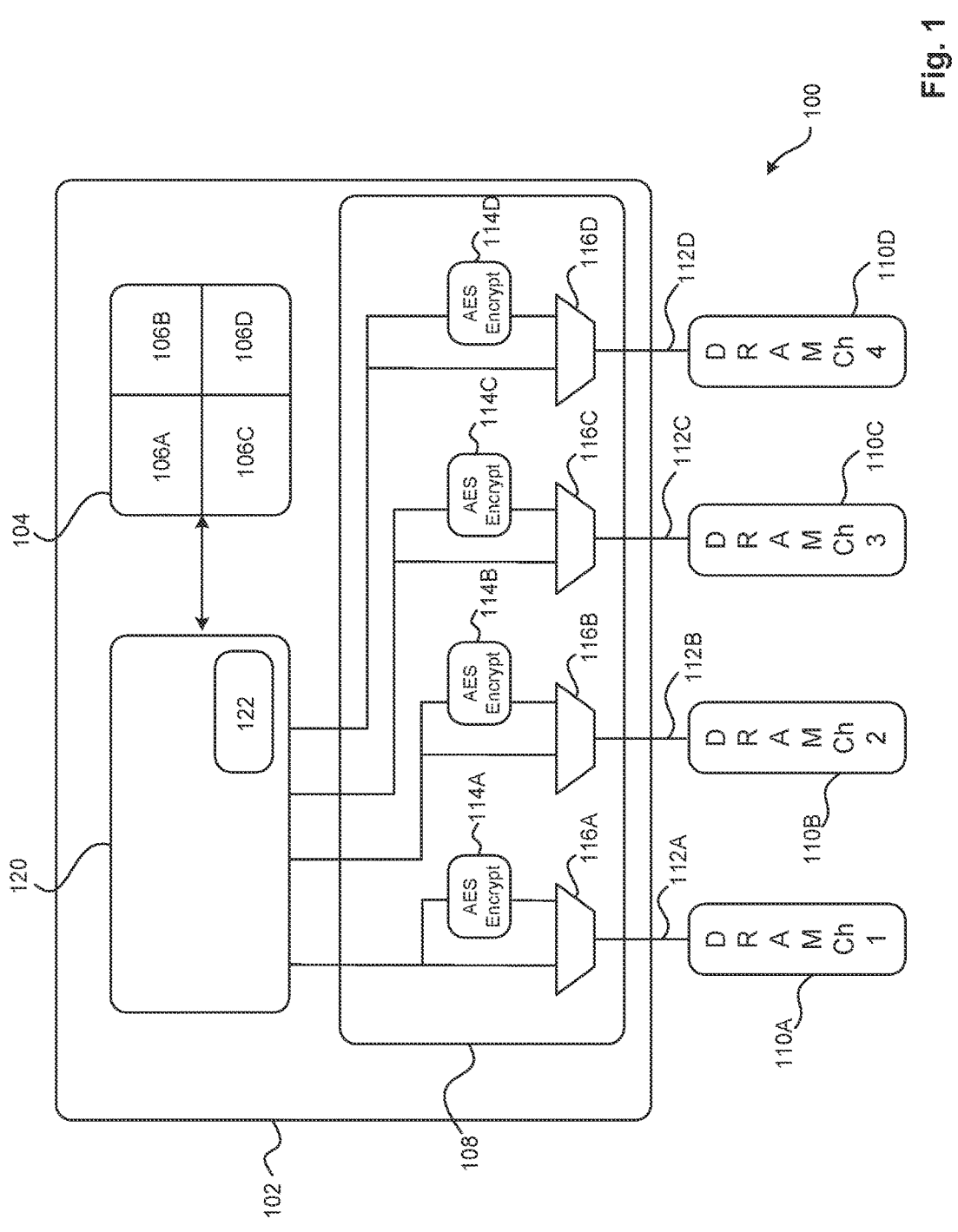
FIG. 1 is a system architecture diagram of a first example embodiment.

FIG. 1 shows an example embodiment comprising a computer apparatus 100 formed on a die 102. The computer apparatus comprises an on-die CPU 104 that includes a plurality of cores. Four cores 106A-106D are shown in the example. The embodiment of FIG. 1 can be based on AMD EPYC™ architecture, but it will be understood that alternative on-die architectures may be used. The skilled person will also appreciate that the number and type of cores, memory modules, data transfer channels, and so on, shown in the Figures are exemplary only and that many variations are possible, e.g. two or more cores, different types of RAM modules, etc.

The computer apparatus 100 also includes a memory controller 108 that controls access to a plurality of RAM modules via a corresponding plurality of data transfer channels. In the example there are four RAM modules 110A-110D and four corresponding channels 112A-112D. The RAM modules can comprise Dynamic Random Access Memory, D-RAM, modules. Each of the RAM modules comprises a plurality of storage locations having a corresponding plurality of physical memory addresses.

In embodiments a plurality of VMs are executed using the cores 106A-106D. One VM may be executed using one or more of the cores. In the example the VMs executed by the four cores are as indicated in the table below:

| Core | VM |
|------|-----|
| 106A | Hypervisor |
| 106B | VM1 (secure memory) |
| 106C | VM2 |
| 106C | VM4 |
| 106C | VM5 |
| 106D | VM3 (secure memory) |

As is conventional, the hypervisor 106A provides an Operating System on which all the other VMs 106B-106D run. The hypervisor also performs other functions, including allocating the cores and, in some cases, secure memory partitions in the storage locations of the RAM modules 110A-110D, to VMs based on available hardware. The hypervisor has visibility of the full range of memory addresses across the RAM modules, but can only directly address data via its reserved channel (112A in the example). The hypervisor 106A can assign data transfer channels 112 to VM(s) 106 based on prescribed settings in a known manner.

The memory controller 108 can further include at least one component for encrypting/decrypting data that is written to/read from the RAM modules 110. The example embodiment is based on SME and uses AES encryption, but it will be understood that alternatives are possible. The on-die memory controller can use page tables to mark specific pages of memory in the D-RAM modules for encryption by AES controllers 114A-114D associated with each of the channels 112A-112D. Pages with a C-bit set to 1 in a corresponding register 116A-116D can store encrypted data, whilst pages with the C-bit set to 0 are written directly to memory without being encrypted. The memory controller can then automatically decrypt the encrypted data when it is read. SME uses an ephemeral 128-bit encryption key which is created randomly using a hardware random generator at each boot.

Unlike conventional on-die computer apparatus, the embodiment of FIG. 1 further includes a data transfer channel controller 120. This can comprise a separate micro-controller that is mounted on the die 102 between the CPU 104 and the memory controller 108 and controls data transfer between those components. Conventionally, the CPU would be directly connected to the memory controller so that the cores can directly access the data transfer channels 112 for read/write operations. As discussed above, this can lead to compromised security.

The channel controller 120 of the example embodiment is configured to provide secure data transfer over the plurality of data transfer channels 112, thereby improving security between the VMs executed by the cores 106 and the RAM modules 110. The channel controller comprises (or is in communication with) a storage 122 that stores security information indicating which of the VMs 106 is designated as secure, and channel information indicating which of the data transfer channels is assigned for use by each of the VMs to access its allocated physical memory addresses. The designation of a VM as secure can be made by an administrator system user or algorithmically by the hypervisor or other component.

In instances where the administrator determines that a particular VM 106 should use secure memory, it may be a simple case of the classification for the data handled by the VM requiring the system to be secure, or that the system is being used in such a way that it requires the system to be made secure. In other instances, the hypervisor 106A, or another system component, such as the secure channel controller 120, can allocate how secure memory should be used. In an example, the hypervisor is directed to host three guest VMs, VM 1, VM 2 and VM 3, all of which may share the same security marking or classification; however, VM 1 and VM 2 are operating in the same networked domain Domain 1', whilst VM 3 is operating in another network domain Domain 2'. Whilst all three VMs share the same security classification, there could be an additional security stipulation that Domain 1 and Domain 2 are required to be separate/isolated from each other. Conventionally, this would mean that two separate machines would be required to run these VMs despite sharing the security classification. In embodiments of the present invention, however, the hypervisor, or other system component, such as the data transfer channel controller 120, understands these rules/conditions and automatically determines, by checking the individual VMs' requirements against the resources, which of the VMs is designated for secure memory. In the example, the guest VM 3 is allocated secure memory by the hypervisor because it is required to be isolated form guest VM 1 and 2, despite sharing the same security classification.

In some cases, prior to 'booting' a guest VM, the hypervisor 106A can check the VM boot configuration for its security setting and/or encryption allocation. This can be set up by the appropriate administrator during system configuration, or each time a new guest VM is added. The security setting and/or encryption allocation can be manifested in different forms, depending on the desired level of hypervisor/administrator security, varying from a simple text file in the guest VM configuration declaring the guest VM settings, to a hashed value which calls to a look up table within a protected area or folder of the hypervisor's own file structure, for instance. This setting, once declared to the hypervisor, can then be relayed to the data transfer channel controller 120 and from there the channels can be allocated.

In an alternative example, rather than the hypervisor 106A determining which information is given to the data transfer channel controller 120, at the time the guest VM is 'booted', when the call for memory addresses is made, the hypervisor runs an interrupt and the data transfer channel controller looks at the security setting and/or encryption allocation configuration file or hashed value to allocate the channels. This is similar to the previous example, except that the data transfer channel controller holds a copy of the hashed values against the security settings levels, separately from the hypervisor. The data transfer channel controller can then relay the allocation information back to the hypervisor, ending the interrupt and allowing the normal boot sequence of the guest VM to continue.

The secure memory partition addresses are securely stored within the dedicated storage 122 of the channel controller 120, separately from all other data stores of the computer apparatus 100, and so should not be accessible by the VMs. An example of stored security and channel information is shown in the table below:

| | Security information | Encrypted or Not Encrypted | Channel information/Memory allocation |
|---|---|---|---|
| Hypervisor | Memory | (Encrypted) | Channel 112A |
| VM1 | Secure memory | (Encrypted) | Channel 112B |
| VM2 | Memory | (Encrypted) | Channel 112D |
| VM3 | Secure memory | (Encrypted) | Channel 112C |
| VM4 | Memory | | Channel 112D |
| VM5 | Memory | | Channel 112D |

Thus, in this example, VM1 and VM3 each have an exclusive dedicated data transfer channel (112B and 112C, respectively) for accessing their secure memory, whilst VM1, VM4 and VM5 can use the same data channel (112D) to access memory that is not designated as secure.

The skilled person will understand that the security information and the channel information can be stored in any suitable format and using any suitable data structure. For example, there may be a default configuration that all VMs are to use non-secure memory and security data may be provided only for VMs specifically designated as secure.

The channel controller 120 can use the stored information to direct read/write requests from a particular VM over the data transfer channel 112 that is assigned to the VM. If a VM is designated as "secure" according to the security information then the channel controller will only allow the core 106 executing that secure VM to read/write data via its assigned channel when a data transfer session is active (post boot). The allocation of channels to secure VMs means that a RAM module 110 can effectively be configured store data exclusively for a secure VM and not to store data for (or accessible by) any of the other VMs. Thus, embodiments can provide improved security for stored data because the channel controller can ensure that only the secure VM can access the data transfer channel associated with the RAM module that contains its secure data.

Figure 2:
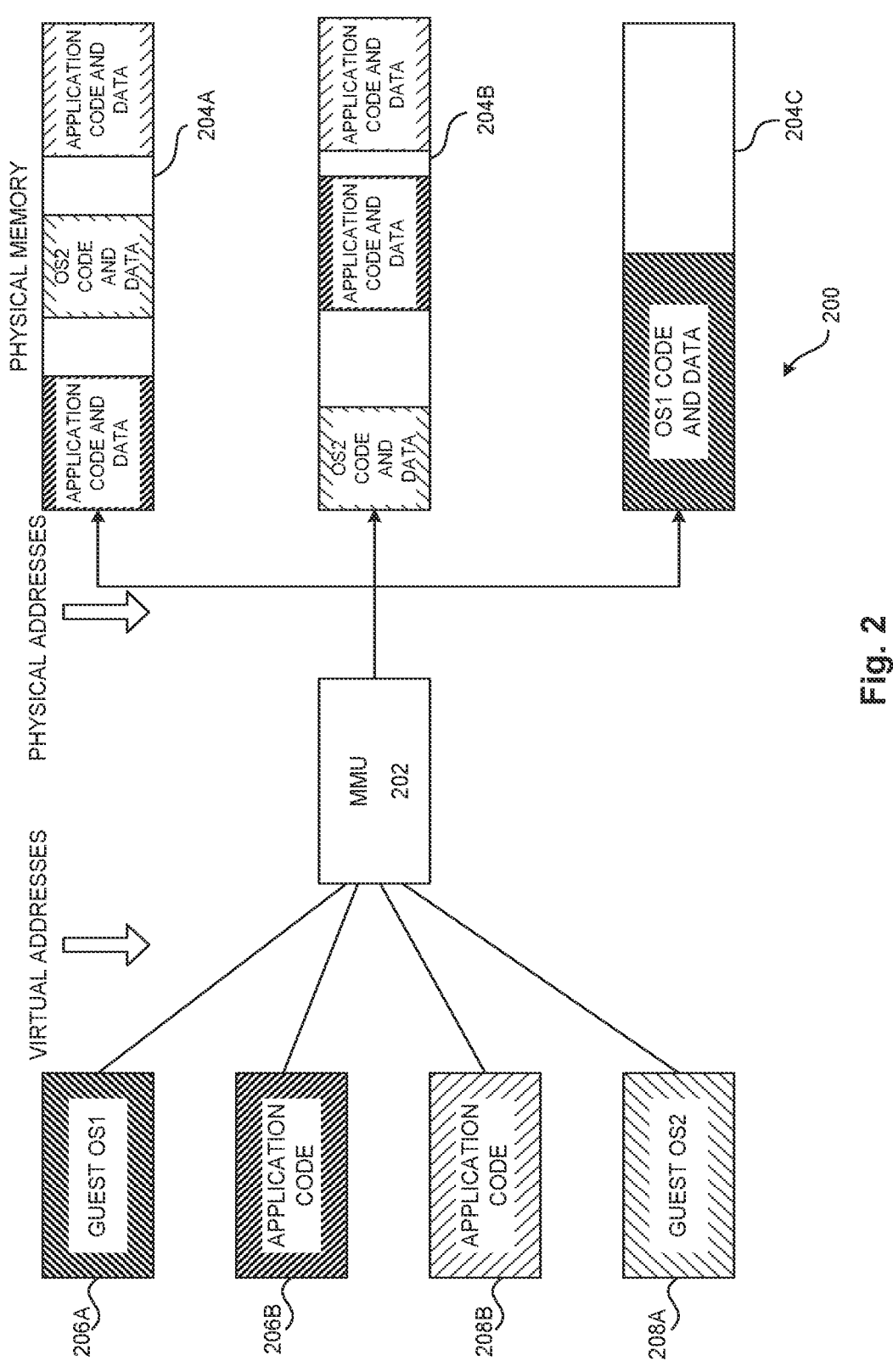
FIG. 2 is a system architecture diagram of a conventional on-die computer apparatus based on ARM architecture.

FIG. 2 schematically illustrates a conventional computer apparatus 200 based on Advanced RISC (Reduced Instruction Set Computing) Machine, ARM, architecture and configured to execute VMs.

The computer apparatus 200 comprises a Memory Management Unit, MMU, 202 that controls data transfer between a set of VMs and a set of RAM modules 204A-204C. The VMs are executed by a plurality of cores (not illustrated) and include a first guest OS 206A and its application code 206B, and a second guest OS 208A and its application code 208B. Code executed by the VMs uses virtual addresses when issuing read/write requests. The MMU converts these into physical addresses in the RAM modules in a known manner. As shown, the RAM modules can be used to store application code and data for more than one VM. For example, parts of the code and data for the second guest OS are stored on both the first RAM module 204A and the second RAM module 204B, along with application code and data of other guest OSs/VMs in some cases. This arrangement therefore suffers from security risks as discussed above.

Figure 3:
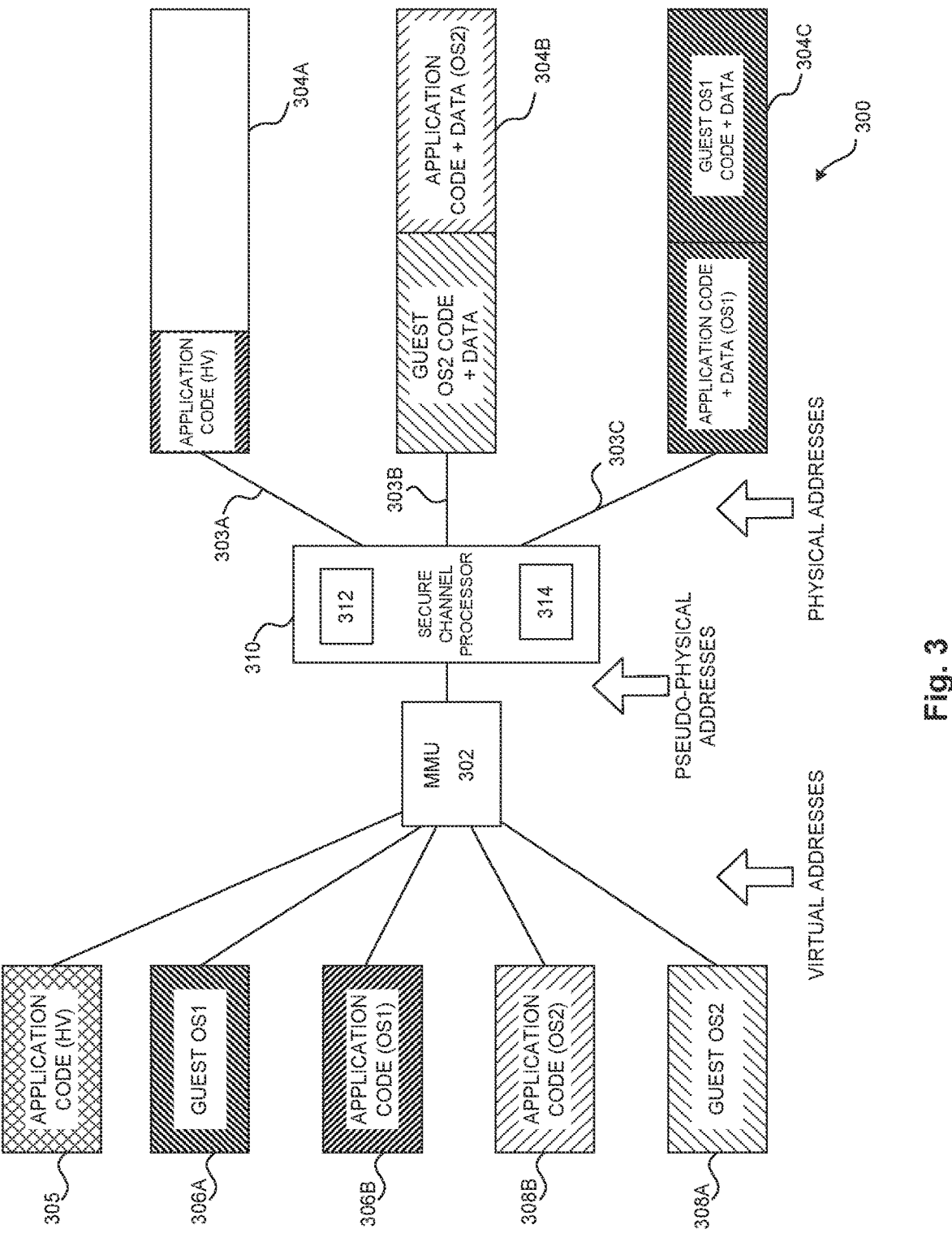
FIG. 3 is system architecture diagram of a second example embodiment based on ARM architecture.

FIG. 3 illustrates an embodiment comprising computer apparatus 300 based on ARM architecture and executing a plurality of VMs. The computer apparatus comprises an MMU 302 that controls data transfer between a set of VMs and a set of RAM modules 304A-304C. The VMs are executed by a plurality of cores (not illustrated) and include a hypervisor executing application code 305; first guest OS 306A and its application code 306B, and a second guest OS 308A and its application code 308B.

In contrast the to the conventional arrangement of FIG. 2, the computer apparatus 300 illustrated in FIG. 3 further includes a data transfer channel processor/controller 310. This is located between the MMU 302 and a plurality of data transfer channels 303A-303C connected to the respective plurality of RAM modules 304A-304C and controls data transfer between these components. Each of the data transfer channels may be associated with an encryption/decryption component, e.g. AES components.

Similar to the embodiment of FIG. 1, the channel controller 310 may comprise a storage 312 that stores security information indicating which of the VMs is designated as secure, and channel information indicating which of the data transfer channels is assigned for use by each of the VMs to access its allocated physical memory addresses. The allocation of channels to secure VMs means that a RAM module can be configured store data in a physically separated manner for a secure VM so that it does and store data for any of the other VMs. In the example of FIG. 3, the first RAM module 304A only contains code for the hypervisor application 305; the second RAM module 304B only contains code and data for the first guest OS 306A and its application code 306B, and the third RAM module 304C only contains code and data for the second guest OS 308A and its application code 308B. In some embodiments, depending on requirements, one VM may utilise more than one channel and RAM module. It will also be appreciated that the apparatus may comprise other RAM modules that can be used to store data/code for one or more non-secure VM.

For improved security, in some embodiments the channel processor 310 may be configured to further convert memory addresses specified in read/write requests issued by the VMs. In the example embodiment the memory addresses into which the MMU 302 converts virtual addresses in the read/write requests are termed "pseudo-physical addresses". These are not the actual/correct physical addresses in the RAM modules 304A-304C but, rather, are intermediate values/addresses used for the purposes of modified data read/write operations that can be executed by some embodiments for additional security. In some alternative embodiments, these operations may be performed by a computer apparatus that is not necessarily configured to store/use the security information and channel information as described herein. The pseudo-physical addresses can be generated by an algorithm executed by a channel allocation processor 314 within the channel processor upon boot-up and then stored as address conversion data (e.g. a table in the storage 312 or another storage component within/in communication with the channel controller). The channel processor 310 can convert the pseudo-physical addresses provided by the MMU 302 using the address conversion data into the actual/correct physical addresses for the RAM modules 304A-304C. As the address conversion data is stored completely separately from other data of the computer apparatus it should be secure and inaccessible to VMs.

Figure 4:
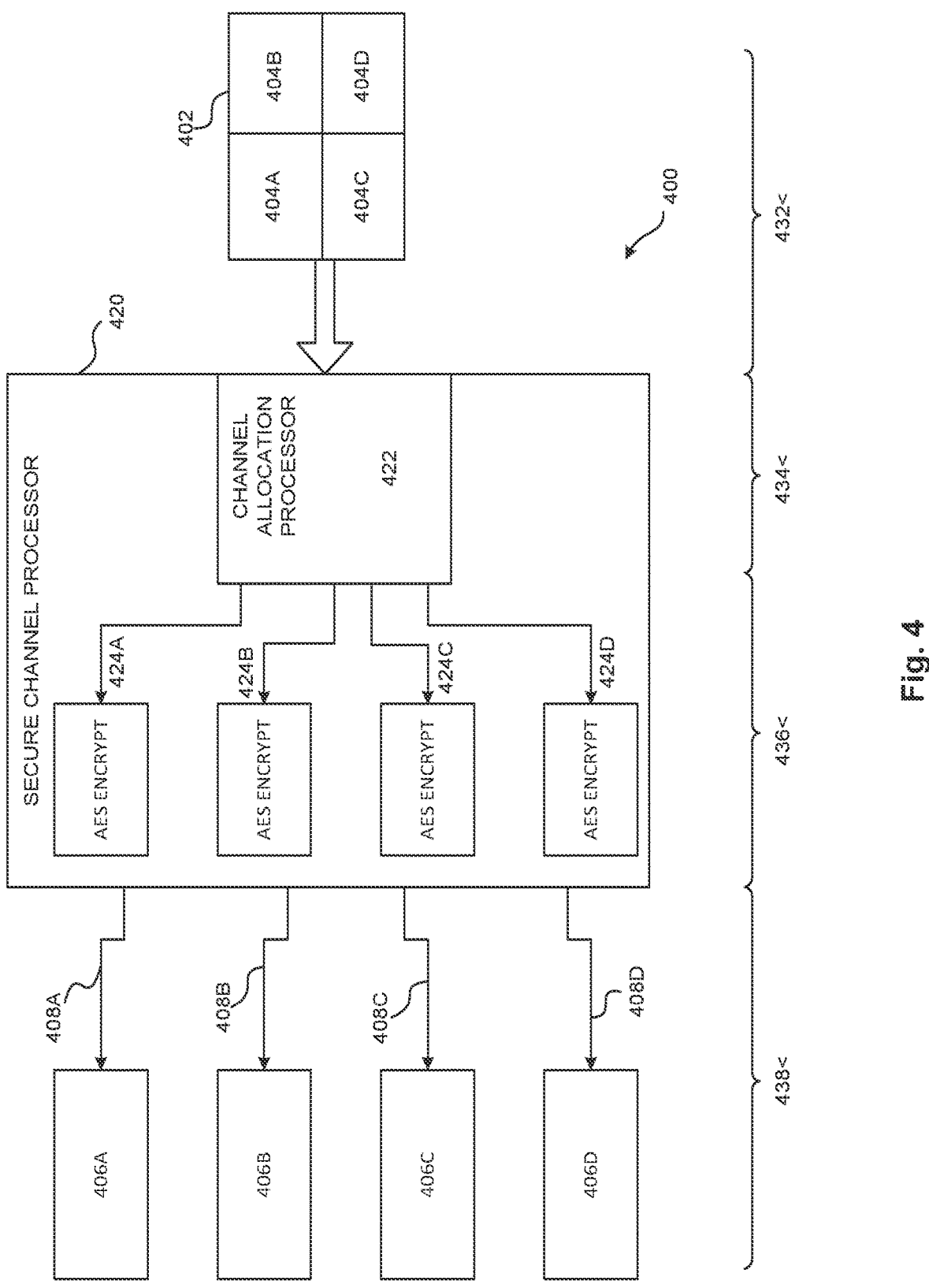
FIG. 4 illustrates steps performed during a data write operation executed by a third example embodiment.

FIG. 4 schematically illustrates steps performed by an embodiment executing a data write operation involving the additional memory address conversion. It will be appreciated that the steps shown are exemplary only and in alternative embodiments some steps may be re-arranged or omitted. Additional steps may be performed in some cases. It will also be understood that embodiments may be implemented using any suitable hardware, software, operating system, programming language, data structures, etc.

The embodiment of FIG. 4 includes an on-die computer apparatus 400 having a CPU 402 comprising a plurality of cores 404A-404D. The computer apparatus further comprises a plurality of RAM modules 406A-406D, each associated with one of a plurality of data transfer channels 408A-408D. The computer apparatus further includes a data transfer channel processor 420 that includes a channel allocation processor 422 and AES encryption/decryption components 424A-424D associated with each of the data transfer channels.

The channel allocation processor 422 may use an algorithm for channel allocation. In some cases, the algorithm might be relatively simple and provide a randomly generated cipher key (e.g. generated at boot) for the channel allocation processor, which is then used to encrypt all the physical addresses with the resulting string values encrypting the physical addresses that are stored as a table of pseudo addresses for the channel allocation processor to 'offer' to the hypervisor as addressable memory. This may change the cipher key with each boot sequence. Alternatively, the cipher key and encrypted look-up address table may be changed on a rolling program within the algorithm, so that after an arbitrary time period has passed (the frequency of change may be dependent on the desired level of complexity), the cipher key is replaced by a new one, in turn replacing the values in the look up table (provided that the value was not being used at that time, or that it was currently being interrogated and so no change would cause the loss of data). In other cases, the algorithm may be more complex, e.g. the channel allocation processor may use a cipher key held by the data transfer channel processor 420, so that whilst the channel allocation processor has the look-up table values, the actual generation and translation of the pseudo addresses to physical addresses (as discussed below) remains within/performed by the secure channel processor, with the cipher key being a randomly generated value within the SCP, with no visibility of it from any other components, not even visible to the hypervisor.

Step 432 illustrates a data write request being issued by a VM executed by one or more of the cores 404 of the computer apparatus 400. The write request is received by the channel allocation processor 422 of the channel processor 420. The data write request refers to pseudo-physical addresses that can be converted to physical memory addresses by embodiments.

Step 434 illustrates the channel allocation processor 422 using the address conversion data to translate the pseudo-physical addresses in the write request into physical addresses and writing data to only the data transfer channel(s) 408 associated with the RAM module(s) 406 that contain the physical addresses. As mentioned above, depending on requirements, a secure VM may utilise more than one channel/RAM module.

Step 436 illustrates the data to be written being encrypted by an AES encryption component(s) 424 associated with the channel(s) 408. This step may be executed optionally, based on a flag set by the channel controller, which is dependent on the VM issuing the write request being designated as secure according to the stored security information. In some embodiments the encryption may be performed using a cipher/key that is unique to the data transfer channel(s).

Step 438 illustrates the encrypted/unencrypted data (depending on the VM's security setting) being written to the RAM module(s) 406 associated with the channel(s) 408.

Figure 5:
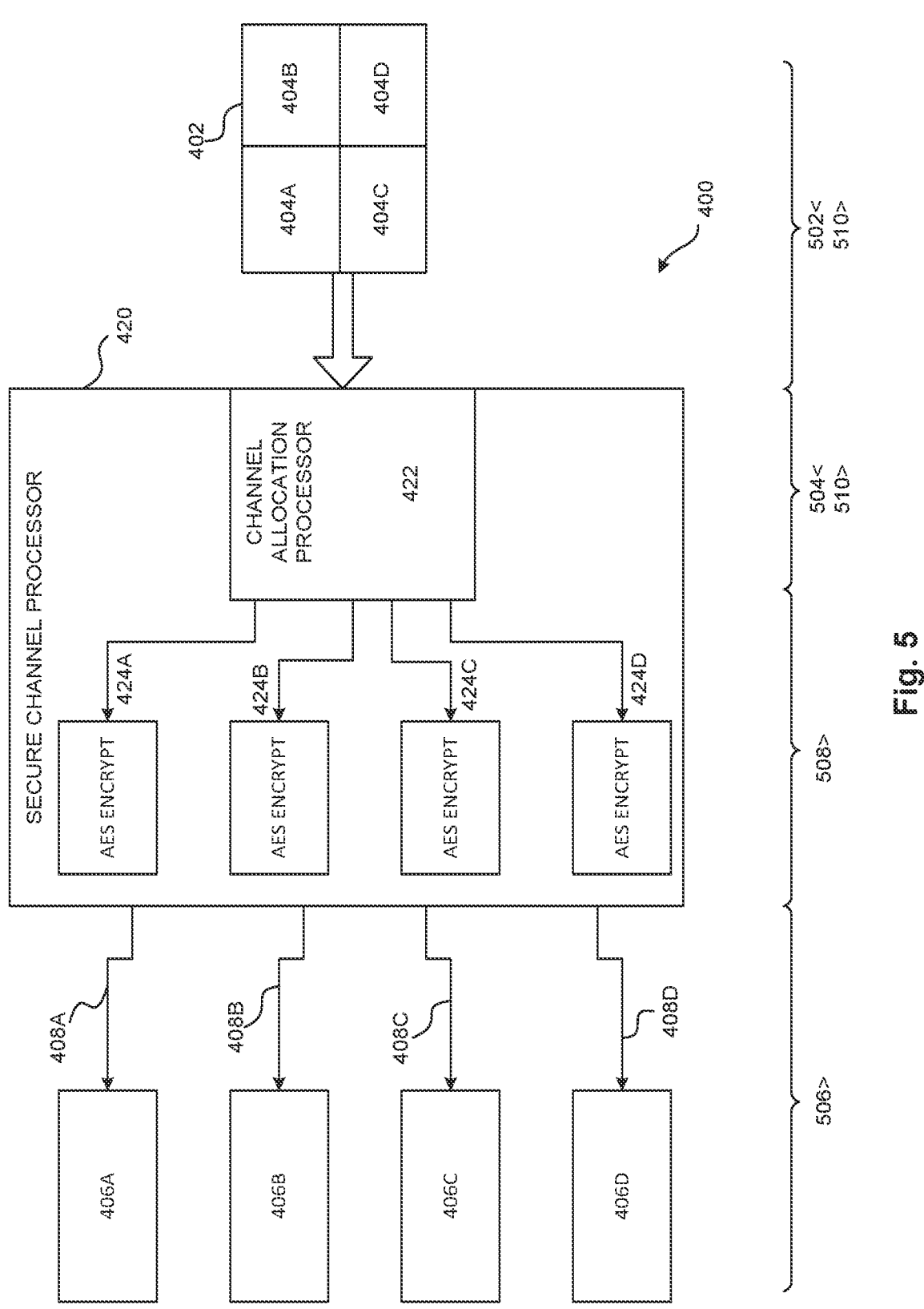
FIG. 5 illustrates steps performed during a data read operation executed by the third example embodiment.

FIG. 5 schematically illustrates steps performed by the computer apparatus 400 in a data read operation involving the additional memory address conversion.

Step 502 illustrates a data read request issued by a VM executing on one or more cores 404 of the CPU 402 of the computer apparatus 400 being received by the channel processor 420. The read request can specify pseudo-physical addresses.

Step 504 illustrates the channel allocation processor 422 converting the pseudo-physical addresses to physical addresses using the address conversion data and calling the data transfer channel(s) 408 to the RAM module(s) 406 containing the physical addresses.

Step 506 illustrates data being read from the physical addresses via the called channel(s) 408. If the read data is encrypted then it is decrypted, as indicated at step 508.

Step 510 illustrates the read (and optionally decrypted, e.g. based on the flag set by the channel controller 420) data being fed back to the pseudo-physical addresses specified in the data read request in response to the data read request.

Thus, embodiments of the invention disclosed herein provide a computer apparatus with a separate memory controller that can prevent one compromised VM infecting another VM by way of RAM modules. Embodiments achieve this in a surprising manner because the skilled person normally aims to keep data processing overheads to a minimum and so is prejudiced against extra processing steps that involve transferring additional data to/from RAM modules and including an additional controller in an on-die computer.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. An on-die computer apparatus comprising:
a plurality of cores;
a plurality of RAM modules, each of the RAM modules comprising a plurality of storage locations having a corresponding plurality of physical memory addresses, wherein a plurality of sets of the physical memory addresses are allocated for use by a respective plurality of virtual machines (VMs), each of the VMs being executed by at least one of the plurality of cores;
a plurality of data transfer channels, each of the data transfer channels being dedicated for one of the RAM modules, each data transfer channel configurable as a secure or non-secure channel, wherein when a VM is designated as secure and assigned to a particular data transfer channel, only one VM is assignable to said particular data transfer channel, and
a channel controller for controlling data transfer over the plurality of data transfer channels, the channel controller being configured to:
store security information indicating which of the VMs is designated as secure, and channel information indicating which of the data transfer channels is assigned for use by each of the VMs for accessing its allocated physical memory addresses, and
direct read/write requests from a respective VM over the data transfer channel assigned to the respective VM based on the security information and the channel information.

2. Apparatus according to claim 1, wherein the channel controller is configured to determine, based on the security information, if a respective VM is designated as secure, and to only allow the secure VM to read/write data over its assigned data transfer channel, and
wherein a respective RAM module having storage locations corresponding to the physical memory addresses allocated to the secure VM is configured not to store data for another of the plurality of VMs.

3. Apparatus according to claim 1, wherein each of the plurality of data transfer channels is associated with a respective one of a plurality of encryption/decryption components, and
wherein the channel controller is further configured to store information indicating if data related to the read/write requests from each of the VMs is to be encrypted/decrypted by a respective one of the plurality of encryption/decryption components.

4. Apparatus according to claim 3, wherein the channel controller is located between, and controls data transfer between, the plurality of cores and a memory controller that includes the plurality of encryption/decryption components.

5. Apparatus according to claim 3, wherein encryption/decryption is performed by a respective one of the plurality of encryption/decryption components using a cipher/key unique to its associated data transfer channel.

6. Apparatus according to claim 1, wherein the channel controller is further configured to:
    generate an intermediate memory address for each of the physical memory addresses, and
    convert a respective intermediate memory address associated with a respective read/write request into the physical memory address generated for the intermediate memory address.

7. Apparatus according to claim 1, wherein the security information and the channel information is stored in a secure storage area of a storage device within the channel controller.

8. Apparatus according to claim 1, wherein at least one of the cores is configured to execute a hypervisor configured to allocate the plurality of sets of the physical memory addresses for use by the respective plurality VMs.

9. A controller adapted to control data transfer over a plurality of data transfer channels, each of the data transfer channels being dedicated for one of a plurality of RAM modules of an on-die computer apparatus that comprises a plurality of cores, wherein each of the RAM modules comprises a plurality of storage locations having a corresponding plurality of physical memory addresses, and wherein a plurality of sets of the physical memory addresses are allocated for use by a respective plurality of virtual machines (VMs), each of the VMs being executed by at least one of the plurality of cores, each data transfer channel configurable as a secure or non-secure channel, wherein when a VM is designated as secure and assigned to a particular data transfer channel, only one VM is assignable to said particular data transfer channel,
    wherein the controller is configured to:
        store security information indicating which of the VMs is designated as secure, and channel information indicating which of the data transfer channels is assigned for use by each of the VMs for accessing its allocated physical memory addresses, and
        direct read/write requests from a respective VM over the data transfer channel assigned to the respective VM based on the security information and the channel information.

10. A method of operating an on-die computer apparatus comprising a plurality of cores and a plurality of RAM modules, each of the RAM modules comprising a plurality of storage locations having a corresponding plurality of physical memory addresses, the method comprising:
    allocating a plurality of sets of the physical memory addresses for use by a respective plurality of virtual machines (VMs), each of the VMs being executed by at least one of the plurality of cores,
    storing, by a channel controller configured to control data transfer over a plurality of data transfer channels, each of the data transfer channels being dedicated for of the RAM modules, each data transfer channel configurable as a secure or non-secure channel, wherein when a VM is designated as secure and assigned to a particular data transfer channel, only one VM is assignable to said particular data transfer channel, security information indicating which of the VMs is designated as secure, and channel information indicating which of the data transfer channels is assigned for use by each of the VMs for accessing its allocated physical memory addresses, and
    directing, by the channel controller, read/write requests from a respective VM over the data transfer channel assigned to the respective VM based on the security information and the channel information.

11. A method according to claim 10, further comprising:
    the channel controller determining, based on the security information, if a respective VM is designated as secure, and only allowing the secure VM to read/write data over its assigned data transfer channel,
    wherein a respective RAM module having storage locations corresponding to the physical memory addresses allocated to the secure VM is configured not to store data for another of the plurality of VMs.

12. A method according to claim 10, wherein each of the plurality of data transfer channels is associated with a respective one of a plurality of encryption/decryption components, and
    the channel controller stores information indicating if data related to the read/write requests from each of the VMs is to be encrypted/decrypted by a respective one of the plurality of encryption/decryption components.

13. A method according to claim 12, wherein the channel controller controls data transfer between the plurality of cores and a memory controller that includes the plurality of encryption/decryption components, the method including performing encryption/decryption by a respective one of the plurality of encryption/decryption components using a cipher/key unique to its associated data transfer channel.

14. A method according to claim 10, further comprising:
    generating, by the channel controller, an intermediate memory address for each of the physical memory addresses;
    converting, by a memory management unit, a virtual memory address specified in a respective write request into an intermediate memory address, and
    converting, by the channel controller, the intermediate memory address into the physical memory address generated for the intermediate memory address.

15. A computer readable medium storing a computer program to operate a method according to claim 10.

16. A method according to claim 11, wherein each of the plurality of data transfer channels is associated with a respective one of a plurality of encryption/decryption components, and
    the channel controller stores information indicating if data related to the read/write requests from each of the VMs is to be encrypted/decrypted by a respective one of the plurality of encryption/decryption components.

17. A method according to claim 11, further comprising:
    generating, by the channel controller, an intermediate memory address for each of the physical memory addresses;
    converting, by a memory management unit, a virtual memory address specified in a respective write request into an intermediate memory address, and
    converting, by the channel controller, the intermediate memory address into the physical memory address generated for the intermediate memory address.

18. A method according to claim 12, further comprising:
    generating, by the channel controller, an intermediate memory address for each of the physical memory addresses;
    converting, by a memory management unit, a virtual memory address specified in a said respective write request into an intermediate memory address, and
    converting, by the channel controller, the intermediate memory address into the physical memory address generated for the intermediate memory address.

19. A method according to claim 13, further comprising:

generating, by the channel controller, an intermediate memory address for each of the physical memory addresses;

converting, by a memory management unit, a virtual memory address specified in a respective write request into an intermediate memory address, and converting, by the channel controller, the intermediate memory address into the physical memory address generated for the intermediate memory address.

20. Apparatus according to claim 2, wherein each of the plurality of data transfer channels is associated with a respective one of a plurality of encryption/decryption components, and wherein the channel controller is further configured to store information indicating if data related to the read/write requests from each of the VMs is to be encrypted/decrypted by a respective one of the plurality of encryption/decryption components.

* * * * *